US010389581B2

(12) United States Patent
Stephenson et al.

(10) Patent No.: US 10,389,581 B2
(45) Date of Patent: *Aug. 20, 2019

(54) ACCESS-POINT CONTROLLER DISCOVERY VIA AN INTERMEDIARY

(71) Applicant: ARRIS Enterprises LLC, Suwanee, GA (US)

(72) Inventors: David Sheldon Stephenson, San Jose, CA (US); William S. Kish, Saratoga, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/713,610

(22) Filed: Sep. 23, 2017

(65) Prior Publication Data

US 2018/0026841 A1 Jan. 25, 2018

Related U.S. Application Data

(63) Continuation of application No. 14/503,133, filed on Sep. 30, 2014, now abandoned.

(51) Int. Cl.
*H04L 12/24* (2006.01)
*H04L 29/06* (2006.01)
(Continued)

(52) U.S. Cl.
CPC ...... *H04L 41/0806* (2013.01); *H04L 63/0823* (2013.01); *H04W 12/06* (2013.01);
(Continued)

(58) Field of Classification Search
CPC ...... H04W 16/06; H04W 76/12; G06Q 10/10; H04L 12/46
(Continued)

(56) References Cited

U.S. PATENT DOCUMENTS 8,341,717 B1 12/2012 Delker .............................. 726/10
9,143,400 B1 9/2015 Roskind .................. H04L 41/08
(Continued)

OTHER PUBLICATIONS

International Search Report and Written Opinion for PCT/US2015/052404, dated Jan. 13, 2016.
(Continued)

*Primary Examiner* — Bryan F Wright
(74) *Attorney, Agent, or Firm* — Stewart M. Wiener; Steven E. Stupp

(57) ABSTRACT

In order to configure an access point, the access point requests information specifying an associated cloud-based controller when the access point is first turned on at a user location. In particular, the access point may provide, to a configuration device, a controller query requesting information specifying a unique network address of a cloud-based controller associated with the access point. This controller query may include an identifier of the access point (such as a serial number). Then, the access point receives, from the configuration device, the information specifying the unique network address of the cloud-based controller, such as a fully qualified domain name of the cloud-based controller. Note that the cloud-based controller may be one of multiple cloud-based controllers from different providers, and the access point may be associated with the cloud-based controller based on the received information specifying unique network address.

23 Claims, 6 Drawing Sheets

(51) Int. Cl.
*H04W 12/06* (2009.01)
*H04W 92/12* (2009.01)
*H04L 12/46* (2006.01)
*H04W 12/00* (2009.01)

(52) U.S. Cl.
CPC ............. *H04W 92/12* (2013.01); *H04L 12/46* (2013.01); *H04L 41/12* (2013.01); *H04L 63/0876* (2013.01); *H04W 12/00516* (2019.01)

(58) Field of Classification Search
USPC ............................................................ 726/7
See application file for complete search history.

(56) References Cited

U.S. PATENT DOCUMENTS

| | | | |
|---|---|---|---|
| 9,161,239 B2 | 10/2015 | Mercier | H04W 24/02 |
| 9,509,746 B2 | 11/2016 | Mehta | H04L 67/02 |
| 2006/0114839 A1 | 6/2006 | Meier | 370/254 |
| 2008/0130598 A1* | 6/2008 | Kalhan | H04W 64/00 370/338 |
| 2008/0281972 A1* | 11/2008 | Gupta | G06Q 10/10 709/228 |
| 2009/0024746 A1* | 1/2009 | Welch | H04L 12/4625 709/228 |
| 2009/0129291 A1* | 5/2009 | Gupta | H04W 8/26 370/254 |
| 2010/0099432 A1 | 4/2010 | Glover | 455/456.1 |
| 2010/0161969 A1* | 6/2010 | Grebovich | H04L 9/321 713/156 |
| 2010/0182984 A1 | 6/2010 | Herscovici | 370/338 |
| 2010/0313262 A1* | 12/2010 | Mehta | H04L 63/0823 726/12 |
| 2011/0078282 A1* | 3/2011 | Wei | H04L 67/06 709/219 |
| 2012/0233478 A1 | 9/2012 | Mucignat | 713/320 |
| 2012/0259992 A1* | 10/2012 | Koehler | H04W 76/12 709/229 |
| 2012/0266201 A1 | 10/2012 | Kanojia | 725/109 |
| 2013/0121207 A1 | 5/2013 | Parker | 370/254 |
| 2014/0086177 A1 | 3/2014 | Adjakple | 370/329 |
| 2014/0105094 A1 | 4/2014 | Soundararajan | 370/312 |
| 2014/0126466 A1 | 5/2014 | Hamdi | 370/328 |
| 2014/0157298 A1 | 6/2014 | Murphy | |
| 2014/0181267 A1 | 6/2014 | Wadkins et al. | H04L 47/193 |
| 2014/0247792 A1 | 9/2014 | Wang | H04W 28/16 |
| 2014/0334406 A1* | 11/2014 | Chen | H04W 16/06 370/329 |
| 2016/0182305 A1* | 6/2016 | Martin | H04L 41/12 726/10 |
| 2016/0323810 A1* | 11/2016 | May | H04L 12/46 |
| 2016/0337945 A1* | 11/2016 | Watt | H04W 76/10 |

OTHER PUBLICATIONS

Office Action for U.S. Appl. No. 14/503,133, dated Mar. 23, 2016.
Response to Office Action for U.S. Appl. No. 14/503,133, dated Jan. 20, 2017.
Office Action for U.S. Appl. No. 14/503,133, dated Jun. 7, 2016.
Response to Office Action for U.S. Appl. No. 14/503,133, dated Oct. 7, 2016.
Office Action for U.S. Appl. No. 14/503,133, dated Dec. 29, 2016.
Response to Office Action for U.S. Appl. No. 14/503,133, dated Mar. 28, 2017.
Office Action for U.S. Appl. No. 14/503,133, dated Jun. 29, 2017.
Extended European Search Report for European Patent Application Serial No. 15847247.2, dated May 16, 2018.

* cited by examiner

ACCESS-POINT CONTROLLER DISCOVERY VIA AN INTERMEDIARY

CROSS REFERENCE TO RELATED APPLICATIONS

This application claims priority under 35 U.S.C. 120 as a Continuation of U.S. patent application Ser. No. 14/503,133, entitled "Discovery of Cloud-Based Access-Point Controllers," by David Sheldon Stephenson and William S. Kish, filed Sep. 30, 2014, the contents of which are herein incorporated by reference.

BACKGROUND

Field

The described embodiments relate to techniques for discovering an access-point controller. In particular, the described embodiments relate to techniques for discovering a cloud-based access-point controller in an embodiment that includes multiple access-point controllers associated with different providers.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard, which is sometimes referred to as Wi-Fi®, or Bluetooth® from the Bluetooth Special Interest Group of Kirkland, Wash.), and/or another type of wireless network.

Moreover, electronic devices typically communicate with a wired network (such as the Internet) via access points in wireless local area networks. For example, an electronic device may access the Internet by wireless communication with an access point using Wi-Fi. In turn, multiple access points in one or more wireless local area networks may be associated with a local-area-network controller (which is sometimes referred to as a 'controller'), which is a centralized device (usually accessed via a wired network) that is aware of the environment(s) of the one or more wireless local area networks, including the presence of the multiple access points. Because of its centralized location and intelligence, a local-area-network controller can be used to: lower the cost of deployment, simplify the management of the access points and/or provide multiple layers of security.

Recently, engineers have investigated implementing local-area-network controllers in the cloud. However, there exist additional challenges in a cloud-based architecture. For example, it may be cumbersome and time-consuming for users to identify or discover which cloud-based local-area-network controller is associated with a particular access point. Moreover, because many access points have limited or restricted user interfaces, it is typically difficult for users or information-technology administrators to manually configure an access point, and this process often results in errors that degrade the user experience.

SUMMARY

The described embodiments include an access point. This access point includes an interface circuit that communicates with a configuration device via a network. During operation, the access point provides, to the configuration device, a controller query requesting information specifying a unique network address of a cloud-based controller associated with the access point, where the controller query includes an identifier of the access point, and the cloud-based controller is one of multiple cloud-based controllers from different providers (such as enterprises or service providers). Then, the access point receives, from the configuration device, the information specifying the unique network address of the cloud-based controller.

Note that the identifier may include a serial number of the access point.

Furthermore, the information specifying the unique network address may include a fully qualified domain name of the cloud-based controller.

Additionally, the access point may provide the controller query and may receive the information specifying the unique network address the first time the access point is turned on at a user location and/or after a factory reset of the access point.

In some embodiments, the access point associates with the cloud-based controller based on the received information specifying the unique network address.

Moreover, the access point may include: a processor; and memory, coupled to the processor, which stores a program module executed by the processor. This program module may include instructions for providing the controller query; and instructions for receiving the information specifying the unique network address. Alternatively or additionally, the interface circuit may provide the controller query and may receive the information specifying the unique network address.

Another embodiment provides a computer-program product for use with the access point described previously. This computer-program product includes instructions for at least some of the operations performed by the access point.

Another embodiment provides a method for configuring the access point described previously. This method includes at least some of the operations performed by the access point.

Another embodiment provides the configuration device described previously. This configuration device includes an interface circuit that communicates with the access point via the network. During operation, the configuration device receives, from the access point, the controller query for the information specifying the unique network address of the cloud-based controller associated with the access point, where the controller query includes the identifier of the access point, and the cloud-based controller is one of the multiple cloud-based controllers from the different providers. Moreover, the configuration device identifies the cloud-based controller based on the identifier using a predefined mapping from the identifier to the cloud-based controller. Then, the configuration device provides, to the access point, the information specifying the unique network address of the cloud-based controller.

Furthermore, the configuration device may include: a processor; and memory, coupled to the processor, which stores a program module executed by the processor. This program module includes: instructions for receiving the controller query; instructions for identifying the cloud-based controller; and instructions for providing the information specifying the unique network address. Alternatively or additionally, the interface circuit may: receive the controller query, identify the cloud-based controller and provide the information specifying the unique network address.

Note that the cloud-based controller may be associated with a provider of the access point.

In some embodiments, prior to receiving the configuration request, the configuration device: authenticates a third party, who is other than the provider of the access point and a provider of the cloud-based controller; and receives the predefined mapping from the third party. For example, the third party may include: a distributor of the access point, and a service provider.

Another embodiment provides a computer-program product for use with the configuration device described previously. This computer-program product includes instructions for at least some of the operations performed by the configuration device.

Another embodiment provides a method for configuring the access point described previously. This method includes at least some of the operations performed by the configuration device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to configure an access point, the access point can request information specifying an associated cloud-based controller when the access point is first turned on at a user location or can be factory reset (i.e., a function is activated that returns the access point to the configuration it had when it was shipped from the factory). In particular, the access point may provide, to a configuration device (which is sometimes referred to as an 'access-point registrar'), a controller query requesting information specifying a unique network address of a cloud-based controller associated with the access point. This controller query may include an identifier of the access point (such as a serial number). Then, the access point receives, from the configuration device, the information specifying the unique network address of the cloud-based controller, such as a fully qualified domain name of the cloud-based controller. Note that the cloud-based controller may be one of multiple cloud-based controllers from or deployed by different providers, and the access point may be associated with the cloud-based controller based on the received information specifying the unique network address.

In the discussion that follows, the access point includes a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used.

Figure 1:
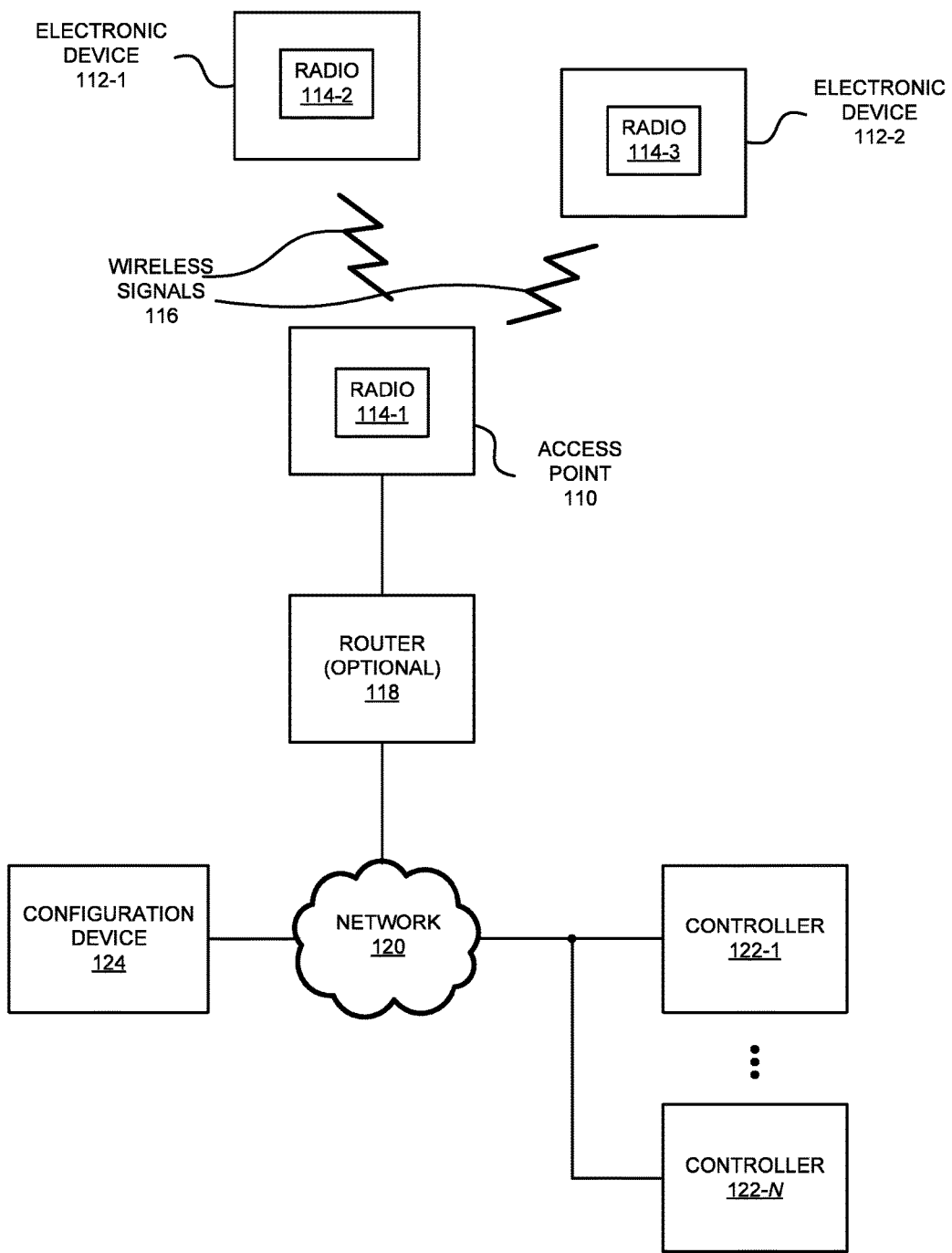
FIG. 1 is a block diagram illustrating electronic devices wirelessly communicating in accordance with an embodiment of the present disclosure.

Communication among electronic devices is shown in FIG. 1, which presents a block diagram illustrating access point 110 and one or more electronic devices 112 (such as portable electronic devices, e.g., cellular telephones) wirelessly communicating according to some embodiments. In particular, these electronic devices may wirelessly communicate while: transmitting advertising frames on wireless channels, detecting one another by scanning wireless channels, establishing connections (for example, by transmitting association requests), and transmitting and receiving data packets.

Figure 6:
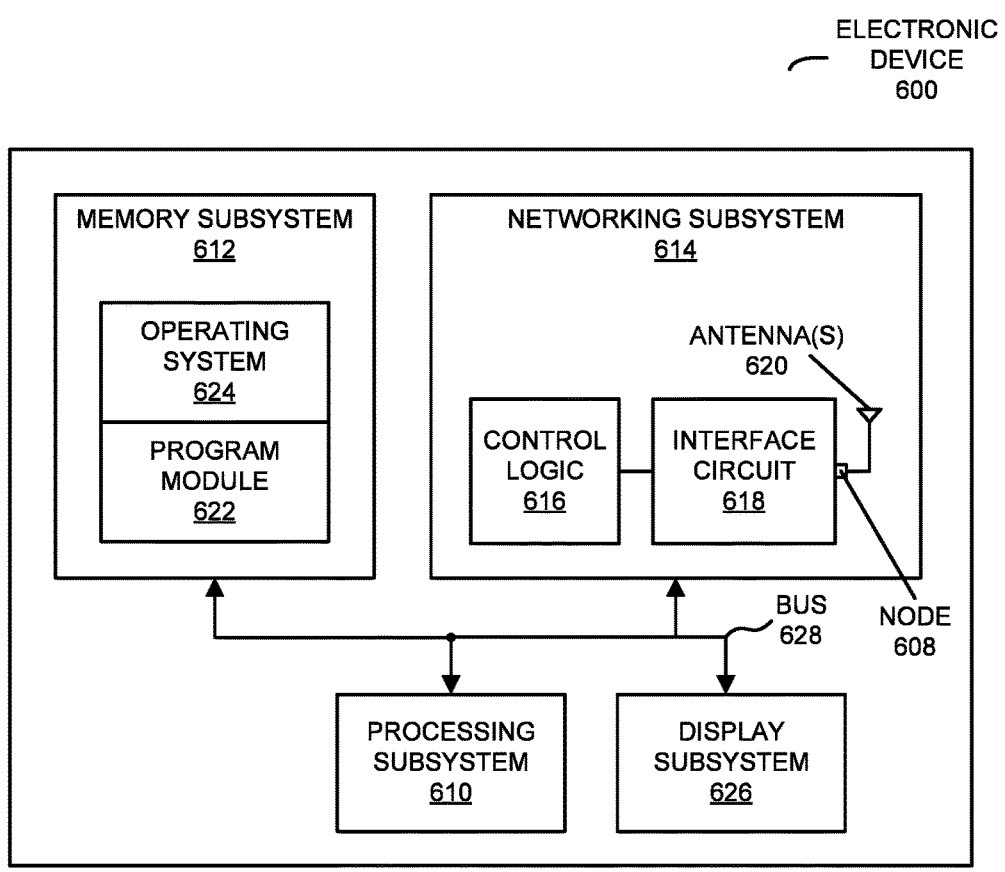
FIG. 6 is a block diagram illustrating one of the electronic devices of FIG. 1 in accordance with an embodiment of the present disclosure.

As described further below with reference to FIG. 6, access point 110 and the one or more electronic devices 112 may include subsystems, such as a networking subsystem, a memory subsystem and a processor subsystem. In addition, access point 110 and the one or more electronic devices 112 may include radios 114 in the networking subsystems. More generally, access point 110 and the one or more electronic devices 112 can include (or can be included within) any electronic devices with the networking subsystems that enable access point 110 and the one or more electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive data packets or frames via the connection, etc.

As can be seen in FIG. 1, wireless signals 116 (represented by jagged lines) are transmitted from a radio 114-1 in access point 110. These wireless signals 116 are received by radios 114 in at least one of the one or more electronic devices 112. In particular, access point 110 may transmit packets. In turn, these packets may be received by at least the one of the one or more electronic devices 112. This may allow access point 110 to communicate information to electronic devices 112. Note that the communication between access point 110 and a given one of electronic devices 112 (such as electronic device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In order to use access point 110, access point 110 may need to be configured when it is first installed at a particular location (which is sometimes referred to as a 'user location'). This configuration may include identifying or discovering a particular controller for access point 110 (and obtaining information specifying a unique network address associated with this controller), and then communicating with the controller so that the controller can assist in configuring access point 110 (such as security for access point 110).

However, as illustrated in FIG. 1, there may be multiple controllers 122 that are, in principle, available. For example, controllers 122 may be accessed via optional router 118 and network 120 (such as the Internet). Therefore, controllers 122 may be implemented on one or more servers that are accessed via network 120 (which are sometimes referred to as 'cloud-based controllers'). Note that controllers 122 may be associated with different providers (i.e., there may be multiple providers of controllers 122). While there is a predefined relationship between one of controllers 122 (such as controller 122-1) and access point 110, this relationship may not be initially known to access point 110. For example, controller 122-1 may be associated with a provider or manufacturer of access point 110.

In existing access points, a variety of techniques may be used to discover controller 122-1. For example, a Dynamic Host Configuration protocol may be used to dynamically distribute network configuration parameters, such as an Internet Protocol address/domain name for controller 122-1. Other existing techniques include: local broadcast and discovery (which may not work with cloud-based controllers), and a Domain Name System query to a local pre-configured domain (which also may not work with cloud-based controllers). However, the existing techniques often require that access point 110 be manually configured, even though the limited or restricted user interface in access point 110 may make this procedure difficult for unsophisticated users or in circumstances wherein the user has many access points to install.

In order to address this problem and to help make configuring access point 110 simpler, more reliable and less time-consuming, in the disclosed communication technique (which is described further below with reference to FIGS. 2-5), a network-accessible configuration device is used to provide the information specifying the unique network address of controller 122-1. In particular, access point 110 may provide, to configuration device 124 (such as a server), a controller query requesting information specifying a unique network address of controller 122-1 associated with access point 110. For example, as noted previously, the controller query may be provided the first time access point 110 is turned on at the user location (i.e., at a deployment time of access point 110) or after a reset to factory settings. Note that the controller query may include an identifier of access point 110, such as a serial number or a media access control address of access point 110. However, other sequences of alphanumeric characters may be used to identify access point 110, such as a random or pseudorandom sequence known to access point 110 and configuration device 124.

In response to receiving the controller query, configuration device 124 may identify controller 122-1 based on the identifier using a predefined mapping from the identifier to controller 122-1. Note that, prior to receiving the configuration request, configuration device 124 may have: authenticated a third party, who is other than the provider of access point 110 (such as a manufacturer of access point 110) and a provider of controller 122-1 (such as an organization or company that deploys controller 122-1); and received the predefined mapping from the third party (such as from a computer operated by or on behalf of the third party). For example, the third party may include: a distributor of access point 110, and/or a service provider (such as an organization or a company that provides a service, e.g., information-technology support, installation and/or maintenance of access point 110, etc.). Then, configuration device 124 may provide, to access point 110, the information specifying the unique network address of controller 122-1.

Next, access point 110 receives, from configuration device 124, the information specifying the unique network address of controller 122-1. Note that the network information may specify controller 122-1 and how access point 110 can access or communicate with controller 122-1. In particular, the information specifying the unique network address may include a fully qualified domain name of controller 122-1. This fully qualified domain name is a globally unique name that can be resolved via a Domain Name System into the unique network address of controller 122-1. (Thus, the information may indirectly specify the unique network address.) Alternatively, the information specifying the unique network address may be the unique network address (such as an IPv4 or an IPv6 network address).

In the described embodiments, processing a packet or frame in access point 110 and/or the one or more electronic devices 112 includes: receiving wireless signals 116 with the packet or frame; decoding/extracting the packet or frame from received wireless signals 116 to acquire the packet or frame; and processing the packet or frame to determine information contained in the packet or frame (such as the feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
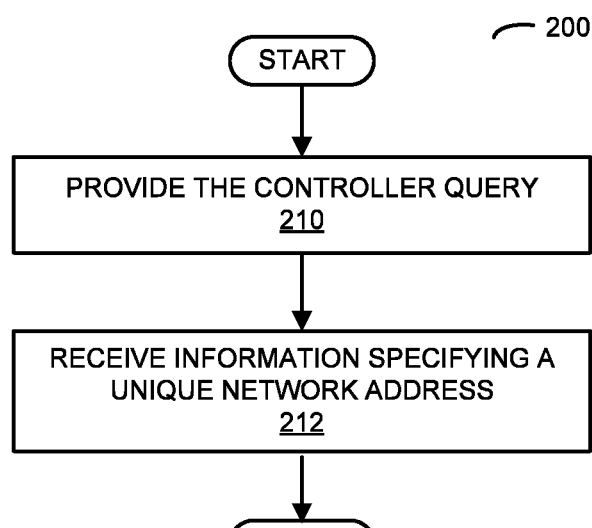
FIG. 2 is a flow diagram illustrating a method for configuring an access point in FIG. 1 in accordance with an embodiment of the present disclosure.

FIG. 2 presents embodiments of a flow diagram illustrating method 200 for configuring the access point that may be performed by the access point (such as access point 110 in FIG. 1) according to some embodiments. During operation, the access point provides, to the configuration device, the controller query for the information specifying the unique network address (operation 210) of the cloud-based controller associated with the access point, where the controller query includes the identifier of the access point (such as a serial number of the access point), and the cloud-based controller is one of multiple cloud-based controllers from different providers. Then, the access point receives, from the configuration device, the information specifying the unique network address (operation 212) of the cloud-based controller.

Figure 3:
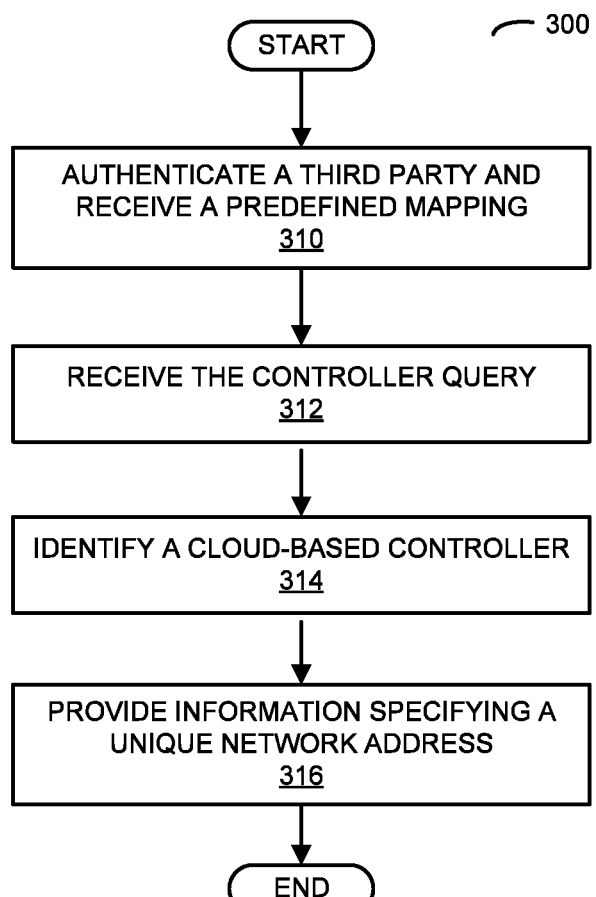
FIG. 3 is a flow diagram illustrating a method for configuring an access point in FIG. 1 in accordance with an embodiment of the present disclosure.

FIG. 3 presents embodiments of a flow diagram illustrating method 300 for configuring the access point that may be performed by the configuration device (such as configuration device 124 FIG. 1) according to some embodiments. During operation, the configuration device receives, from the access point, the controller query (operation 312) for the information specifying the unique network address of the cloud-based controller associated with the access point, where the controller query includes the identifier of the access point, and the cloud-based controller is one of the multiple cloud-based controllers from the different providers. Moreover, the configuration device identifies the cloud-based controller (operation 314) based on the identifier using the predefined mapping from the identifier to the cloud-based controller. Then, the configuration device provides, to the access point, the information specifying the unique network address (operation 316) of the cloud-based controller.

In some embodiments, prior to receiving the controller query (operation 312), the configuration device authenticates a third party and receives the predefined mapping (operation 310) from the third party. In some embodiments, the third party can be other than the provider of the access point and the provider of the cloud-based controller. Furthermore, in some embodiments it is sufficient that the third party be any party who is permitted to make the predefined mapping (e.g., the manufacturer, service provider, provider of the access point and/or controller, or another party). Thus, in some embodiments the relationship between the identifier and the information specifying the unique network address is provided to the configuration device by an authenticated third party.

In these ways, the access point and/or the configuration device (for example, an interface circuit, a driver and/or software executed in an environment of the access point and/or the configuration device) may facilitate configuration of the access point. In particular, the access point may identify and associated with a particular cloud-based controller by requesting the information specifying the unique network address of the controller from the configuration device. This may simplify the configuration of the access point and may reduce errors during the process, thereby improving the user experience when installing the access point.

In some embodiments of methods 200 (FIG. 2) and 300, there may be additional or fewer operations. Moreover, the order of the operations may be changed, and/or two or more operations may be combined into a single operation.

Figure 4:
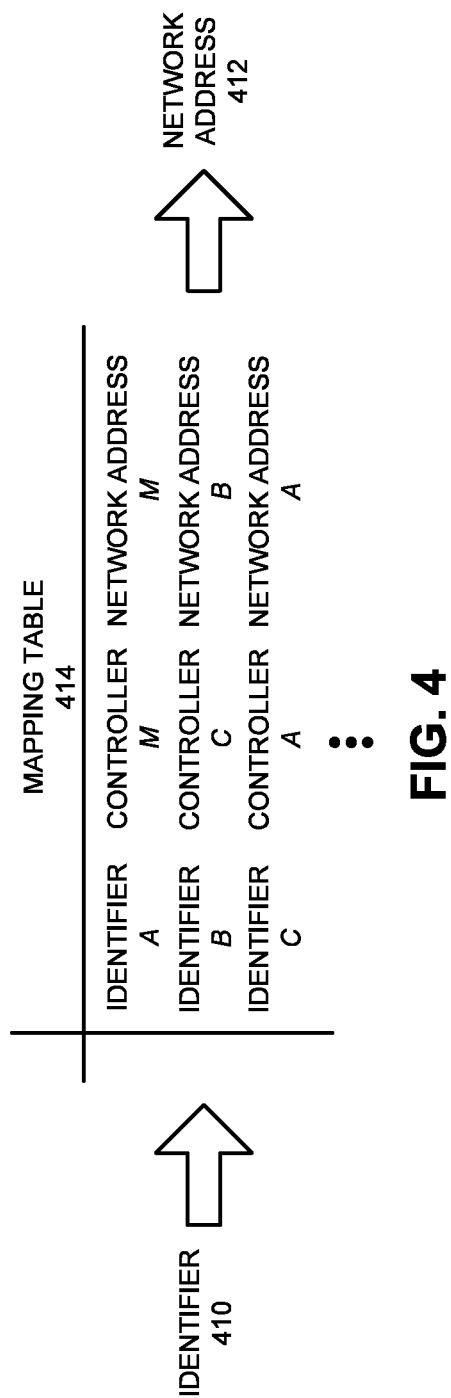
FIG. 4 is a drawing illustrating mapping of an identifier in a controller query to a unique network address during communication among the electronic devices in FIG. 1 in accordance with an embodiment of the present disclosure.

In an exemplary embodiment, the configuration device maps from the identifier to the associated cloud-based controller and the corresponding information specifying the unique network address. This is shown in FIG. 4, which presents mapping of an identifier 410 in a controller query to a (unique) network address 412 (and, more generally, the information) according to some embodiments during communication between access point 110 and configuration device 124 in FIG. 1. In particular, this mapping may use a predefined mapping function or table 414, which was previously received from an authenticated third party.

As noted previously, the third party may include: a service provider, a distributor and/or a partner of a provider of access point 110 (FIG. 1). For example, a service provider (such as one that installs access points), a distributor of access points and/or a partner that assists in fulfillment may pre-capture the identifier, such as by optically or electronically (e.g., using near-field communications) scanning the serial number of access point 110 (FIG. 1) and entering this information in an online portal (via an application programming interface) associated with configuration device 124 (FIG. 1). In particular, the service provider, the distributor and/or the partner may provide the identifier that maps to a user account, which in turn has an associated controller and the information specifying the unique network address. (Note that the service provider, the distributor and/or the partner may be authenticated by a password or X.509 client certificate.) This information may be provided to configuration device 124 (FIG. 1) via the online portal. Alternatively, the identifier may include a token provided by the service provider, the distributor and/or the partner. In this case, the identifier of the token may be provided to configuration device 124 (FIG. 1) via the online portal. After the mapping from the token to the identifier (and, thus, to the information specifying the unique network address) is provided to configuration device 124, a user of access point 110 (FIG. 1) may subsequently use the token as a proxy for the identifier. In particular, the controller query may include information associated with the token, which specifies the identifier.

Note that the communication technique may be used to configure an access point when there is no local controller. Thus, in some embodiments the communication technique is used if another discovery technique for configuring the access point (such as by using a Dynamic Host Configuration protocol, local broadcast and discovery, a Domain Name System, and/or manual configuration) does not yield or discover a controller for the access point.

In an exemplary embodiment, the controller query includes the serial number of the access point in a Hypertext Transfer Protocol over Secure Socket Layer (HTTPS) GET request to a uniform resource locator of the configuration device. In response, the configuration device may provide a fully qualified domain name compatible with RFC-1035 (from the Internet Engineering Task Force of Reston, Va.) with an Internet media type of the configuration device or an IPv4 or IPv6 address.

Note that in the event of an empty response or a Hypertext Transfer Protocol failure, the access point may proceed with its existing access-point discovery logic (e.g., by iterating through the other discovery techniques described above). For example, if the configuration device does not have a specific record of the serial number or media access control address of a cloud-based controller for the access point, it may return an empty response.

Furthermore, the access point may confirm that the configuration device has a valid Secure Socket Layer certificate. However, the access point may not have a Secure Socket Layer certificate, and may not need to authenticate itself to the configuration device.

Trusted service providers, distributors and/or partners may have an application programming interface to the configuration device that allows them to add mapping from the access-point identifier to the fully qualified domain name of the cloud-based controller. This registration process can be driven by barcode scans of the access-point serial number and/or media access control address.

Note that the same identifier for the access point may be used throughout the communication technique. For example, when an access point presents the identifier to the configuration device, the configuration device may respond with the information specifying the unique network address of the controller. Then, this access point joins this controller and is 'authenticated' by the controller using the identifier of the access point. As noted previously, the identifier may be the access-point serial number, which may be embedded in the access-point manufacturing certificate that is installed on the access point during the manufacturing process. By the identifier when the access point joins the controller, the controller may be ensured that the right or correct access point joined (as opposed to some other access point, such as an attacker trying to insert as a Trojan horse in someone else's network). However, note that the configuration device may not require the access point to authenticate itself. If the access point provides an incorrect identifier, it will just connect to the wrong controller or no controller. Thus, the controller may authenticate the access point based on the identifier, and the configuration device may only include legitimate predefined mappings (with accurate identifiers) into its data structure(s).

Figure 5:
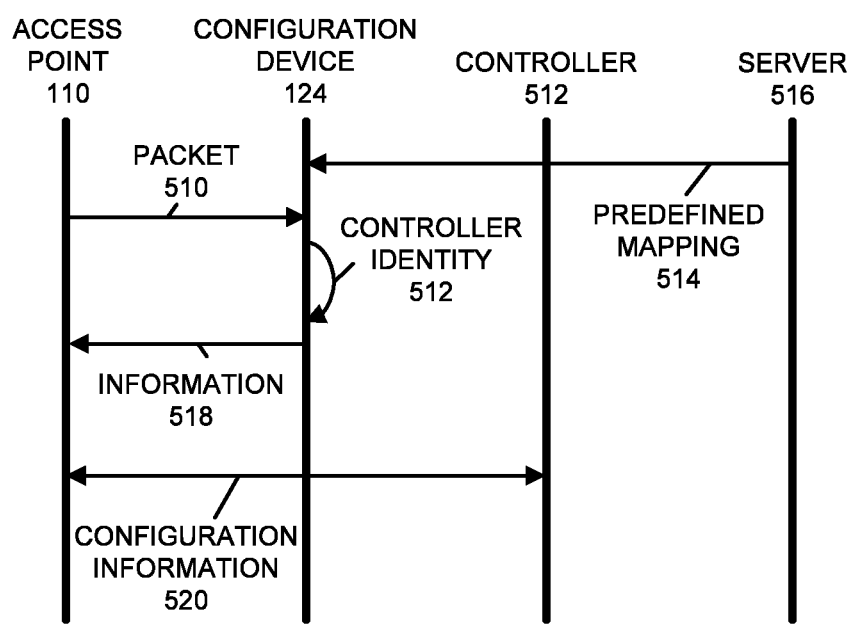
FIG. 5 is a drawing illustrating communication among the electronic devices in FIG. 1 in accordance with an embodiment of the present disclosure.

Embodiments of the communication technique are further illustrated in FIG. 5, which presents a drawing illustrating communication between access point 110 and configuration device 124 according to some embodiments. In particular, access point 110 may provide a packet 510 with the controller query. After receiving the controller query, configuration device 124 may identify a controller 512 based on the identifier using a predefined mapping 514 from the identifier to controller 512. This predefined mapping 514 may have been previously received from the third party, such as a server 516 operated by or on behalf of the third party.

Then, configuration device 124 provides, to access point 110, information 518 specifying unique network address of controller 512. Access point 110 may subsequently use information 518 specifying unique network address to communicate configuration information 520 with controller 512 so that controller 512 can help configure access point 110.

We now describe embodiments of the electronic device. FIG. 6 presents a block diagram illustrating an electronic device 600 (such as access point 110 or configuration device 124 in FIG. 1) according to some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620. (While FIG. 6 includes the one or more antennas 620, in some embodiments electronic device 600 includes one or more nodes, such as node 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a consumer-electronic device, a portable computing device, an access point, a controller, a router, a switch, communication equipment, test equipment, and/or another electronic device.

Although specific components are used to describe electronic device 600, in alternative embodiments, different components and/or subsystems may be present in electronic device 600. For example, electronic device 600 may include one or more additional processing subsystems 610, memory subsystems 612, networking subsystems 614, and/or display subsystems 626. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, calculating the throughput metric, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A configuration device, comprising:
an interface circuit configured to communicate with an electronic device and an access point via a network, wherein the configuration device is configured to:
authenticate a third party, wherein the authenticated third party is in addition to a provider of a access point and a provider of a controller, and wherein the controller is associated with different providers;
receive, at the interface circuit, a predefined mapping associated with an electronic device, wherein the predefined mapping is from an identifier of the access point to a unique network address of the controller associated with the access point;
and wherein the electronic device is associated with the authenticated third party, and the predefined mapping is received from the authenticated third party and the electronic device is different from the controller or a second controller associated with the access point;
receive, at the interface circuit, a controller query associated with the access point that requests the unique network address of the controller associated with the access point, wherein the controller query comprises the identifier of the access point;
determine the unique network address of the controller based at least in part on the predefined mapping and the identifier;
and provide, from the interface circuit, the unique network address of the controller associated with the access point, wherein the controller is designated to authenticate and to configure the access point.

2. The configuration device of claim 1, wherein the identifier comprises a serial number of the access point.

3. The configuration device of claim 1, wherein the identifier comprises a token proxy for a serial number of the access point.

4. The configuration device of claim 1, wherein the identifier comprises a media access control (MAC) address of the access point.

5. The configuration device of claim 1, wherein the information specifying the unique network address comprises a fully qualified domain name of the controller.

6. The configuration device of claim 1, wherein the configuration device is configured to provide, from the interface circuit, a valid Secure Socket Layer certificate intended for the access point.

7. The configuration device of claim 1, wherein the interface circuit is configured to: receive the predefined mapping, receive the controller query, determine the unique network address, and provide the information.

8. The configuration device of claim 1, wherein the controller is associated with the provider of the access point.

9. The configuration device of claim 1, wherein the configuration device is configured to perform, via the interface circuit, authentication of the third party prior to receiving the predefined mapping.

10. The configuration device of claim 1, wherein the entity authenticated third party comprises a distributor of the access point.

11. The configuration device of claim 1, wherein the information obviates a need for manual configuration of the access point.

12. A non-transitory computer-readable storage medium in conjunction with a configuration device, the computer-readable storage medium storing program instructions to provide information, wherein, when executed by the configuration device, the program instructions cause the configuration device to perform one or more operations comprising:
   authenticate a third party, wherein the authenticated third party is in addition to a provider of a access point and a provider of a controller, and wherein the controller is associated with different providers;
   receiving, at an interface circuit in the configuration device, a predefined mapping associated with an electronic device, wherein the predefined mapping is from an identifier of an access point to a unique network address of the controller associated with the access point,
   and wherein the electronic device is associated with the entity authenticated third party, and the predefined mapping is received from the authenticated third party, and the electronic device is different from the controller or a second controller associated with the access point;
   receiving, at the interface circuit, a controller query associated with the access point that requests the the unique network address of the controller associated with the access point, wherein the controller query comprises the identifier of the access point;
   determining the unique network address of the controller based at least in part on the predefined mapping and the identifier;
   and providing, from the interface circuit, the unique network address of the controller associated with the access point, wherein the controller is designated to authenticate and to configure the access point.

13. The computer-readable storage medium of claim 12, wherein the identifier comprises one of: a serial number of the access point, a token proxy for the serial number of the access point, or a media access control (MAC) address of the access point.

14. The computer-readable storage medium of claim 12, wherein the one or more operations comprise providing, from the interface circuit, a valid Secure Socket Layer certificate intended for the access point.

15. The computer-readable storage medium of claim 12, wherein the one or more operations comprise performing, via the interface circuit, authentication of the third party prior to receiving the predefined mapping.

16. The computer-readable storage medium of claim 12, wherein the authenticated third party comprises a distributor of the access point.

17. A method for providing information, comprising: by a configuration device:
   authenticate a third party, wherein the authenticated third party is in addition to a provider of a access point and a provider of a controller, and wherein the controller is associated with different providers;
   receiving, at an interface circuit in the configuration device, a predefined mapping associated with an electronic device, wherein the predefined mapping is from an identifier of an access point to a unique network address of the controller associated with the access point,
   and wherein the electronic device is associated with the entity authenticated third party, and the predefined mapping is received from the authenticated third party, and the electronic device is different from the controller or a second controller associated with the access point;
   receiving, at the interface circuit, a controller query associated with the access point that requests the the unique network address of the controller associated with the access point, wherein the controller query comprises the identifier of the access point;
   determining the unique network address of the controller based at least in part on the predefined mapping and the identifier; and providing, from the interface circuit, the unique network address of the controller associated with the access point, wherein the controller is designated to authenticate and to configure the access point.

18. The method of claim 17, wherein the identifier comprises one of: a serial number of the access point, a token proxy for the serial number of the access point, or a media access control (MAC) address of the access point.

19. The method of claim 17, wherein the method comprises performing, via the interface circuit, authentication of the third party prior to receiving the predefined mapping.

20. The configuration device of claim 1, wherein the authenticated third party comprises a service provider that provides installation or maintenance of the access point.

21. The computer-readable storage medium of claim 12, wherein the authenticated third party comprises a service provider that provides installation or maintenance of the access point.

22. The method of claim 17, wherein the authenticated third party comprises one of: a distributor of the access point, or a service provider that provides installation or maintenance of the access point.

23. The method of claim 17, wherein the information specifying the unique network address comprises a fully qualified domain name of the controller.

* * * * *